(12) United States Patent
Steinbauer

(10) Patent No.: US 7,218,272 B2
(45) Date of Patent: May 15, 2007

(54) REDUCING ANTENNA BORESIGHT ERROR

(75) Inventor: David L. Steinbauer, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/426,721

(22) Filed: Jun. 27, 2006

(65) Prior Publication Data
US 2006/0238410 A1 Oct. 26, 2006

Related U.S. Application Data

(63) Continuation of application No. 10/961,900, filed on Oct. 8, 2004, now Pat. No. 7,068,215.

(51) Int. Cl.
*G01S 13/44* (2006.01)

(52) U.S. Cl. .......................... 342/141; 342/62; 342/80; 342/97; 342/147; 342/149; 342/159

(58) Field of Classification Search .................. 342/62, 342/80, 95–97, 141, 147–152, 159, 195
See application file for complete search history.

(56) References Cited

U.S. PATENT DOCUMENTS

| 3,230,348 A | 1/1966 | Hammond, Jr. ............. 235/400 |
| 3,341,847 A | 9/1967 | Fried et al. .................... 342/88 |
| 4,136,343 A | 1/1979 | Heffner et al. ............... 342/427 |
| 4,486,756 A | 12/1984 | Peregrim et al. ............ 342/149 |
| 4,502,650 A | 3/1985 | Yueh ......................... 244/3.15 |
| 4,549,184 A | 10/1985 | Boles et al. .............. 342/25 B |
| 4,709,238 A | 11/1987 | Green ......................... 342/427 |
| 4,926,184 A | 5/1990 | Galati et al. ................. 342/149 |
| 5,017,929 A | 5/1991 | Tsuda .......................... 342/427 |
| 6,486,824 B1 | 11/2002 | Shupe ........................... 342/1 |
| 6,646,598 B1 | 11/2003 | Timothy et al. ............ 342/359 |
| 6,961,016 B1 | 11/2005 | Pozgay ........................ 342/77 |
| 7,068,215 B2 | 6/2006 | Steinbauer .................. 342/141 |
| 2003/0035209 A1* | 2/2003 | Willis ......................... 359/399 |
| 2004/0233420 A1 | 11/2004 | Deflumere et al. .... 356/139.03 |
| 2006/0077093 A1* | 4/2006 | Steinbauer .................. 342/141 |
| 2006/0238410 A1* | 10/2006 | Steinbauer .................. 342/141 |

FOREIGN PATENT DOCUMENTS

JP 2002006032 9/2002

OTHER PUBLICATIONS

"*Introduction to Naval Weapons Engineering*", Advanced Radar Systems, www.fas.org/man/dod-101/navy/docs/es310/syllabus.htm, 13 pages, Jun. 2004.

(Continued)

*Primary Examiner*—John B. Sotomayor
(74) *Attorney, Agent, or Firm*—Baker Botts L.L.P.

(57) ABSTRACT

Reducing antenna boresight error includes receiving radar pulses reflected from the ground, where pulses are emitted from the antenna of a radar system, reflected by the ground, and received by the antenna. The return pulses carry information about the ground. Measurement indices are established from radar and platform parameters, and a clutter spectrum is generated from the return pulse information. The amplitude of the clutter spectrum is measured at each of the measurement indices. Whether there is an amplitude imbalance is established in accordance with the measured amplitudes. An error estimate describing an antenna boresight error is determined if there is an amplitude imbalance.

25 Claims, 3 Drawing Sheets

OTHER PUBLICATIONS

Hung, E.K.L, et al., "A technique to refine the elevation estimates in low-angle tracking data measured with an array antenna," Radar Conference, 1990, Record of the IEEE 1990 International, pp. 434-438, May 7-10, 1990.

Lee, Jeom-Hun, et al., "Angular error of LEO tracking system," Proceedings of the SPIE—The International Society for Optical Engineering, vol. 4025, pp. 259-269, 2000.

Geudtner, Dirk, et al., " *Interferometric Alignment of the X-SAR Antenna System on the Space Shuttle Radar Topography Mission*", IEEE Transactions on Geoscience and Remote Sensing, vol. 40, No. 5, pp. 995-1006.

PCT Notification of Transmittal of the International Search Report and the Written Opinion of the International Searching Authority, or the Declaration with attached PCT International Search Report and Written Opinion of the International Searching Authority in International Application No. PCT/US2005/033805, dated Nov. 9, 2006, 12 pages.

* cited by examiner

REDUCING ANTENNA BORESIGHT ERROR

RELATED APPLICATIONS

This application is a continuation of U.S. application Ser. No. 10/961,900, filed Oct. 8, 2004 entitled "Reducing Antenna Boresight Error," now U.S. Pat. No. 7,068,215.

TECHNICAL FIELD

This invention relates generally to the field of radar systems and more specifically to a method and system for reducing antenna boresight error.

BACKGROUND

An airborne radar system may be used to search a volume of space for objects, to track detected objects, to identify certain objects, or to create an image of selected objects. In each case, accurate position knowledge of the radar's antenna may be critical to the quality of information gathered from the radar. Typically, the radar antenna's coordinate frame should be aligned with the Earth's coordinate frame. Misalignment of the antenna may result in incorrect location information about a detected object. In the case of an imaging radar, image artifacts such as shading or distortion can occur if the antenna's position is not accurately known.

According to some known techniques for aligning the antenna, special test equipment is used to mechanically align the antenna to the aircraft body coordinate frame. The test equipment, however, is typically expensive. Additionally, an Inertial Navigation System (INS) is usually employed to accurately determine the aircraft body coordinate frame orientation with respect to the Earth's coordinate frame. Accurate alignment of the INS sensor and the aircraft body coordinate frame must occur for accurate alignment of the radar antenna's coordinate frame to the Earth's coordinate frame. According to other known techniques, special test flights are performed to evaluate estimated alignments. Special test flights, however, may be expensive and time consuming. Furthermore, re-alignment of the antenna, the INS, or both may need to be performed when either system is replaced or repaired.

SUMMARY OF THE DISCLOSURE

In accordance with the present invention, disadvantages and problems associated with previous techniques for reducing antenna boresight error may be reduced or eliminated.

According to one embodiment, reducing antenna boresight error includes receiving radar pulses reflected from the ground, where pulses are emitted from the antenna of a radar system, reflected by the ground, and received by the antenna. The return pulses carry information about the ground. Measurement indices are established from radar and platform parameters, and a clutter spectrum is generated from the return pulse information. The amplitude of the clutter spectrum is measured at each of the measurement indices. Whether there is an amplitude imbalance is established in accordance with the measured amplitudes. An error estimate describing an antenna boresight error is determined if there is an amplitude imbalance.

Certain embodiments of the invention may provide one or more technical advantages. A technical advantage of one embodiment may be that data generated during normal operation of a radar system may be used to reduce antenna boresight error. The use of this data may allow for error reduction during normal operation of the radar system, which may provide for more efficient error reduction.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
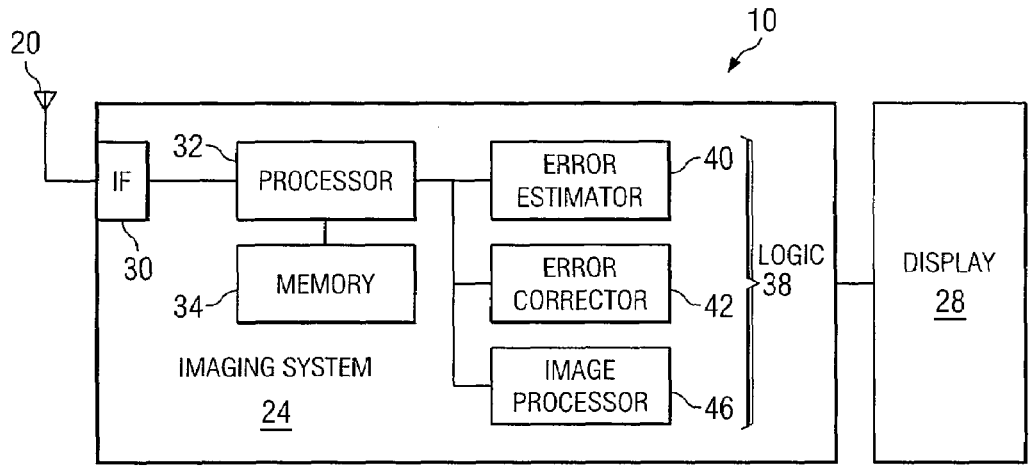
FIG. 1 is a block diagram illustrating a radar system that includes one embodiment of an imaging system that reduces antenna boresight error.

FIG. 1 is a block diagram illustrating a radar system 10 that includes of one embodiment an imaging system 24 that reduces antenna boresight error. In general, imaging system 24 receives radar return information during normal operation. Imaging system 24 dynamically analyzes the information and compensates for errors in the alignment between the navigation system and the antenna of radar system 10. Imaging system 24 may perform alignment correction as a background process while images are generated. In one example, imaging system 24 may be used with a platform of a parent object, for example, an aerial vehicle such as an airplane.

According to one embodiment, reducing antenna boresight error includes receiving radar pulses reflected from the ground, where pulses are emitted from an antenna of a radar system, reflected by the ground, and received by the antenna. The return pulses carry frequency information having characteristics including platform velocity and antenna look angle. Gathering and processing many return pulses create a clutter spectrum that describes the width and center frequency of the ground return information. Measurement indices are established from radar and platform parameters, such as the platform speed, pulse repetition frequency, and commanded antenna look angle. The amplitude of the clutter spectrum is measured at each of the measurement indices. Whether there is an amplitude imbalance at the indices is established in accordance with the measured amplitudes. An error estimate describing an antenna boresight error of the antenna is determined if there is an amplitude imbalance. Many individual error estimates may be combined to validate the boresight error. The error estimate may be fed back into the normal antenna pointing command path, and the sequence may be repeated until the error is minimized.

According to the illustrated embodiment, radar system 10 includes an antenna 20, an imaging system 24, and a display 28 coupled as shown. Antenna 20 includes one or more antenna elements that each transmit, receive, or both transmit and receive signals. An antenna element may refer to a transducer that converts incoming electromagnetic fields of a specific frequency into alternating electric currents having the same frequency, and vice-versa.

Antenna 20 emits signals that may be reflected by an object and received back at antenna 20. A pulse refers to a signal that has been emitted from an antenna, reflected by an object, and received back at the antenna. An object may refer to any object that can reflect the signals emitted by antenna 20. As an example, the ground may be an object. The signals may comprise microwave signals of any suitable frequency, for example, between 9 to 35 GHz. The received reflected signals include information from which an image of the object may be generated.

An antenna boresight refers to the physical axis of a directional antenna. An antenna coordinate frame is typically defined such that the antenna boresight corresponds to the positive z axis. The antenna coordinate frame may be aligned with the local coordinate system of the parent object. For example, an antenna on an aerial vehicle may be aligned such that the antenna boresight looks down the positive z axis of the vehicle, which is typically pointed straight down towards the center of the earth.

Imaging system 24 processes the information carried by the signals to generate an image of the object. According to the illustrated embodiment, imaging system 24 includes an interface (IF) 30, a processor 32, a memory 34, and logic 38 coupled as shown in FIG. 1. Interface 30 receives input and sends output. An interface may refer to any suitable structure of a device operable to receive input for the device, send output from the device, or both, and may comprise one or more ports. Processor 32 manages the operations of radar system 10 and directs logic 38 to perform the operations. A processor may refer to any suitable device operable to execute instructions and manipulate data to perform operations.

Memory 34 stores and facilitates retrieval of information used by processor. Memory may refer to any structure operable to store and facilitate retrieval of information used by a processor, and may comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Logic 38 performs operations of imaging system 24. Logic may refer to any suitable hardware, software, or combination of hardware and software configured to perform a certain operation. Logic 38 may include an error estimator 40, an error corrector 42, an image processor 46, other suitable logic, or any combination of the preceding.

Error estimator 40 generates an estimate of the error describing the misalignment of the antenna boresight. An error estimate may refer to an estimate of the difference between a desired direction of the antenna boresight and the actual direction of the antenna boresight. The desired direction may refer to the direction that optimizes the image generated from the radar signals. The desired direction may be such that the positive z axis of the antenna coordinate system is substantially equivalent to the positive z axis of the coordinate system of the parent object. Error estimator 40 may estimate the error using any suitable method, such as the method described with reference to FIG. 3.

Error corrector 42 determines an error correction estimate in accordance with the error estimate generated by error estimator 40. An error correction estimate refers to an estimate of a correction, or movement, of an antenna that may align the antenna. Error corrector 42 applies the correction estimate in order to reduce the error to align the antenna boresight. Alignment may refer to moving the antenna to reduce the error. Error corrector 42 may comprise any suitable device, such as the device described with reference to FIG. 2.

Image processor 46 is used to process the information of the received signals and generate an image from the processed information. According to one embodiment, image processor 46 generates strips of portions of the image. Each strip describes a portion of the image, and may be formed from a cycle of signals transmitted, reflected, and received. The strips are combined to form the image.

Interface 30, processor 32, memory 34, and logic 38 may be integrated or separated according to particular needs. For example, the present invention contemplates the functions of both processor 32 and memory 34 being provided using a single device. If processor 32 and memory 34 are separated, processor 32 may be coupled to memory 34 using a bus or other suitable link.

Display 28 displays the image. Display 28 may refer to any device suitable for displaying an image. Examples of display 28 include a screen, a monitor, a liquid crystal display, other device, or any combination of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of error estimator 40 and error corrector 42 may be performed by one module, or the operations of error estimator 40 may be performed by more than one module. Additionally, operations of system 10 may be performed using any suitable logic comprising software, hardware, other logic, or any suitable combination of the preceding. As used in this document, "each" refers to each member of a set or each member of a subset of a set.

Figure 2:
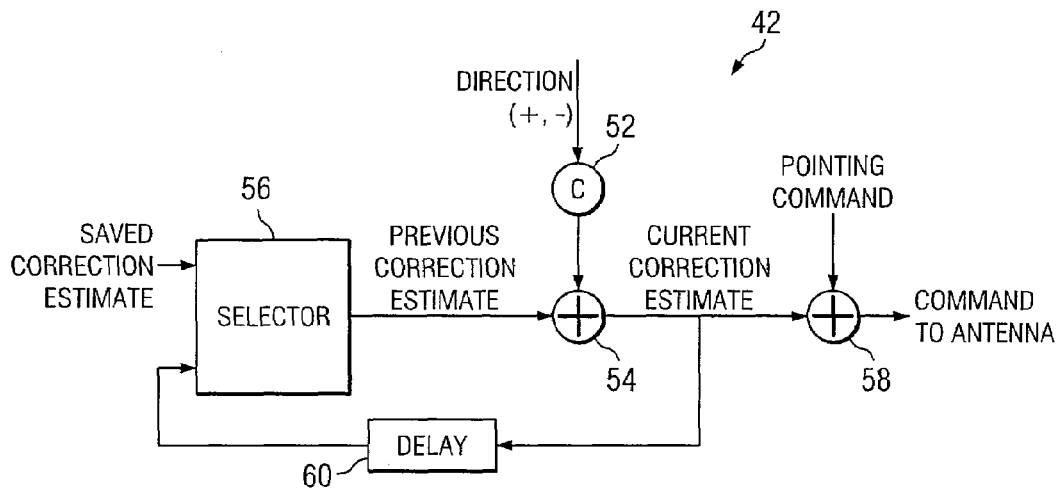
FIG. 2 is a block diagram illustrating one embodiment of an error corrector for correcting an alignment error that may be used with the radar system of FIG. 1.

FIG. 2 is a block diagram illustrating one embodiment of an error corrector 42 for correcting an alignment error that may be used with system 10 of FIG. 1. According to the illustrated embodiment, error corrector 42 includes a multiplier 52, an adder 54, a selector 56, an adder 58, and a delay 60 coupled as shown.

According to one embodiment, error corrector 42 receives an error estimate from error estimator 40. The error estimate may have any suitable format, such as a binary or numerical value. In the illustrated example, the error estimate is provided as a positive or negative error. The positive error may indicate that the antenna boresight is misaligned in one direction, and a negative error may indicate that the antenna boresight is misaligned in the opposite direction.

Multiplier 52 multiplies the estimate by a predetermined constant c to generate an adjustment. Constant c may have any suitable value, for example, less than one degree such as approximately one-tenth of one degree. According to one embodiment, constant c may be dynamically adjusted to change the magnitude of the correction in response to a change in the magnitude of the error estimate. For example, a larger constant c may yield a larger movement of the antenna. Summer 54 adds a previous correction estimate received from selector 56 to the adjustment received from multiplier 52 to generate the current correction estimate. Summer 58 adds the current correction estimate to a pointing command to yield a command that is sent to antenna 20. A pointing command may refer to a command that instructs antenna 20 to move.

Delay 60 delays the current correction estimate for one iteration. An iteration refers to a cycle during which a correction is made, and may last for any suitable duration, for example, approximately two to four seconds such as three seconds. Selector 56 selects a value to be used as the previous correction estimate. During initialization of imaging system 24, a saved correction estimate from a previous use of imaging system 24 may be used as the previous correction estimate. After normal operation, selector 56 may use a correction estimate from a previous iteration received from delay 60 as the previous correction estimate.

Modifications, additions, or omissions may be made to error corrector 42 without departing from the scope of the invention. The components of error corrector 42 may be integrated or separated according to particular needs. Moreover, the operations of error corrector 42 may be performed by more, fewer, or other modules. Additionally, operations of error corrector 42 may be performed using any suitable logic comprising software, hardware, other logic, or any suitable combination of the preceding.

Figure 3:
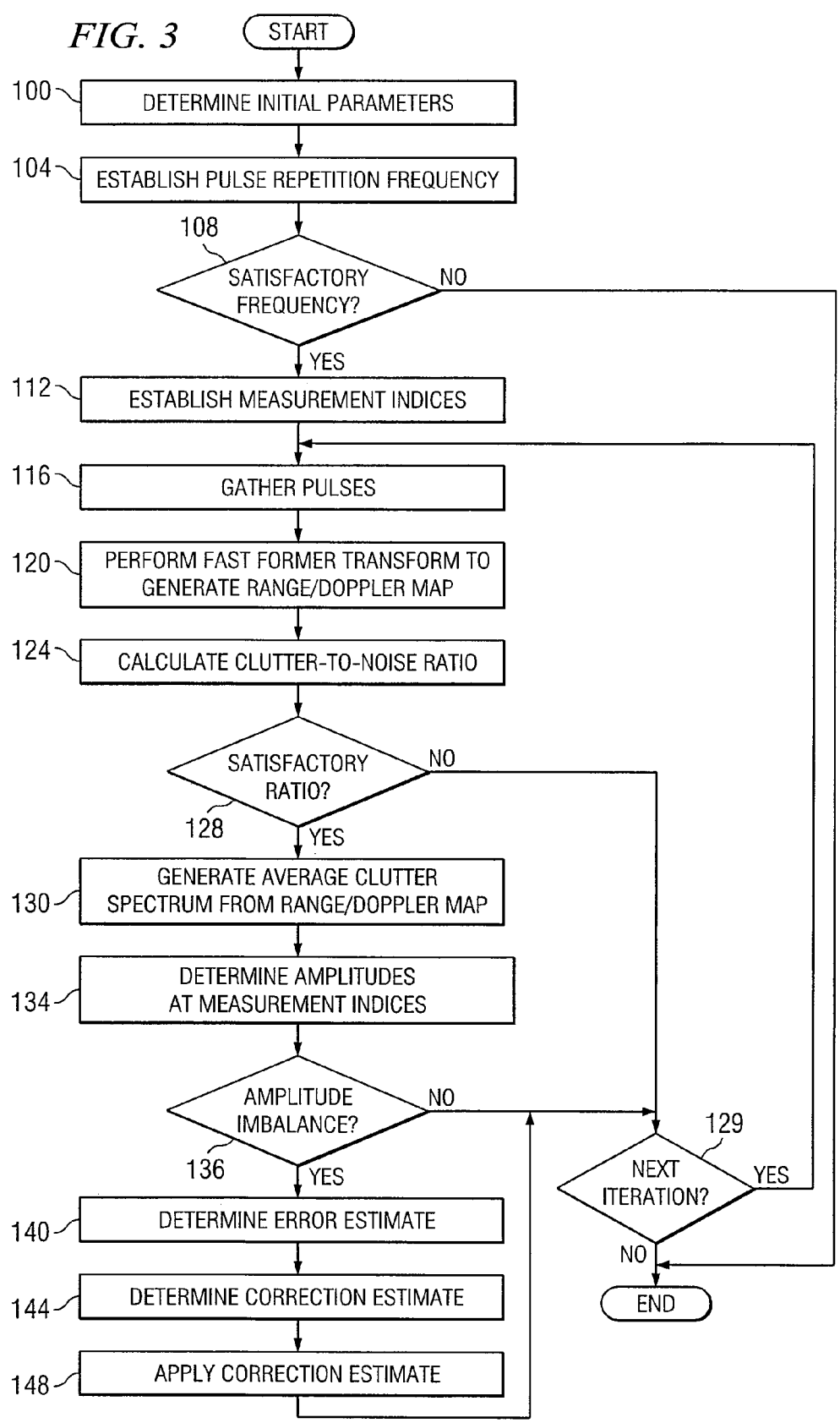
FIG. 3 is a flowchart illustrating one embodiment of a method of reducing antenna boresight error.

FIG. 3 is a flowchart illustrating one embodiment of a method of reducing antenna boresight error. In general, the method determines whether a clutter spectrum is centered about cross-range Doppler frequencies in order to establish whether the antenna boresight of radar system 10 is aligned with the navigation system of a parent vehicle. The clutter spectrum is determined to be centered by measuring the amplitude at measurement indices. If the clutter spectrum is centered, the amplitude should be substantially equivalent.

The method begins at step 100, where initial parameters are determined. The initial parameters may comprise parameters calculated by radar system 10 during normal operation. The initial parameters may include a fast Fourier transform (FFT) size, a pulse repetition frequency (PRF), a resolution, other suitable parameter, or any combination of the preceding. The initial parameters may be calculated from the conditions of a parent vehicle, such as the altitude, speed, other condition, or any suitable combination of the preceding, of the parent vehicle. These parameters are described in more detail with reference to FIG. 4.

Figure 4:
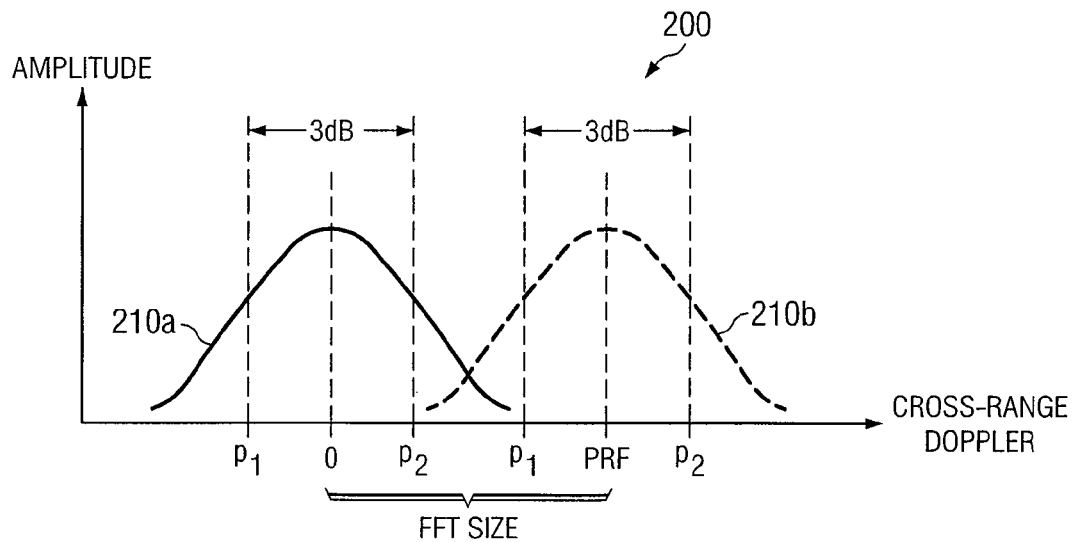
FIG. 4 is a graph illustrating examples of a main clutter spectrum and an alias clutter spectrum.

FIG. 4 is a graph 200 illustrating examples of a main clutter spectrum 210a and an alias clutter spectrum 210b. A clutter spectrum may refer to a graph describing the frequency content of the pulses received by antenna 20. The clutter spectrum may represent a cross-range Doppler frequency, which describes the Doppler frequency content across the beamwidth of the antenna. A main clutter spectrum describes the true frequency content of the received pulses, and an alias clutter spectrum is a duplicate alias version of the main clutter spectrum.

The pulse repetition frequency (PRF) may refer to the frequency at which the pulses are received. If main clutter spectrum 210a has a maximum at a zero frequency, then the maximum of alias clutter spectrum 210b is at the pulse repetition frequency. The fast Fourier transform size may refer to the distance between the maximum of main clutter spectrum 210a and the maximum of alias clutter spectrum 210b. Main clutter spectrum 210a and alias clutter spectrum 210b are shown as examples only, and are not intended to limit the embodiment.

Referring back to FIG. 3, the pulse repetition frequency is established from the initial parameters at step 104. Typically, the pulse repetition frequency is determined during normal operation of radar system 10. The pulse repetition frequency is evaluated to determine whether it is satisfactory at step 108. The frequency is evaluated to check if the conditions are appropriate for boresight error correction. The pulse repetition frequency may be determined to be satisfactory if the frequency is sufficiently high to avoid Doppler aliasing problems.

Referring to FIG. 4, the pulse repetition frequency may be determined to be sufficiently high if the maximum of main clutter spectrum 210a and the maximum of alias clutter spectrum 210b are sufficiently separated to avoid Doppler aliasing. As an example, the pulse repetition frequency may be between approximately 500 to 1,000 pulses per second.

Referring back to FIG. 3, the pulse repetition frequency may be determined to be sufficiently high at step 108 if the minimum pulse repetition frequency $PRF_{min}$ satisfies Equation (1):

$$PRF_{\min} \geq \frac{3 * V_{plat}}{\lambda} \sin\theta_{az} \qquad (1)$$

where $V_{plat}$ represents the velocity of the platform, $\lambda$ represents the wavelength of radar system 10, and $\theta_{az}$ represents the beam width, or the azimuth, of antenna 20. If the frequency is not satisfactory, the method terminates. If the frequency is satisfactory, the method proceeds to step 112.

Measurement indices are established at step 112. A measurement index refers to a point of the cross-range Doppler frequencies at which the amplitude of a clutter spectrum may be measured to establish if the clutter spectrum is centered about a center point of cross-range Doppler frequencies. The center of the frequencies typically corresponds to the center point of the navigation system of the parent vehicle. The measurement index is described in more detail with reference to FIG. 4.

Referring to FIG. 4, points $p_1$ and $p_2$ represent measurement indices. The measurement indices may be centered about a center point of the frequencies. Typically, the center point is set at zero Hz. If the antenna boresight is aligned, the clutter spectrum 210 should be centered around the center point, and the amplitude at the measurement indices should be substantially equivalent. The measurement indices may be selected where a change in amplitude can be easily determined, that is, where the slope of the amplitude is the greatest. According to one embodiment, the 3 dB Doppler points may be selected as the measurement indices. Other suitable points, however, may be selected.

Referring back to FIG. 3, the measurement indices may be selected at step 112 at the 3 dB Doppler indices $p_1$ and $p_2$ according to Equations (2) and (3):

$$P_1 = \text{int}\left(\frac{PRF * V_{plat} * \sin\theta_{az}}{\lambda * FFT_{size}}\right) \qquad (2)$$

$$P_2 = FFT_{SIZE} - P_1 \qquad (3)$$

where PRF represents the pulse repetition frequency, and $FFT_{size}$ represents the fast Fourier transform size.

Pulses are gathered at step 116. Pulses are gathered during normal operation of radar system 10 in order to generate an image. Typically, a pulse includes information that covers a range of distance, which may be divided into range bins. The information of many pulses may be used to generate an image of the object.

A fast Fourier transform is performed on the pulse information to generate a range/Doppler map at step 120. A range/Doppler map refers to a Doppler data map with respect to range. A range/Doppler map may organize the Doppler data into Doppler bins and the range data into range bins. Typically, the fast Fourier transform is performed to create an image strip from the region about the center of the clutter spectrum.

A clutter-to-noise ratio (CNR) is calculated at step 124 to determine if there is sufficient reflective area to generate an error estimate. According to one embodiment, the clutter-to-noise ratio may be calculated by locating the peak of one or more previous average clutter spectrums. For each clutter spectrum, Doppler bins closest to the peak may be averaged for each range bin to generate a clutter-to-noise ratio for each range bin. Any suitable number of Doppler bins, for example, ten Doppler bins, may be averaged.

The clutter-to-noise ratios are evaluated to determine whether they are satisfactory at step 128. As an example, the averages calculated at step 124 may be compared to a threshold value corresponding to a sufficient reflective area. As an example, the required CNR threshold may be set at 6 dB. If a certain percentage, for example, approximately greater than forty percent, of the range bins satisfy the threshold, the clutter-to-noise ratio may be determined to be satisfactory.

If the ratio is not satisfactory at step 128, the method proceeds to step 129 to determine if there is a next iteration. The process may be iterated any suitable number of times in order to automatically correct boresight errors. For example, the process may be repeated every three seconds. If there is a next iteration at step 129, the method returns to step 116 to gather more pulses. If there is no next iteration at step 129, the method terminates. If the ratio is satisfactory at step 128, the method proceeds to step 130.

An average clutter spectrum is generated from the range/Doppler map at step 130. According to one embodiment, the values in each range bin for a Doppler bin may be averaged to generate an average range value for the Doppler bin. The averaged range values for the Doppler bins yield an average clutter spectrum. The amplitudes at the measurement indices are determined at step 134, as described in more detail with reference to FIG. 5.

Figure 5:
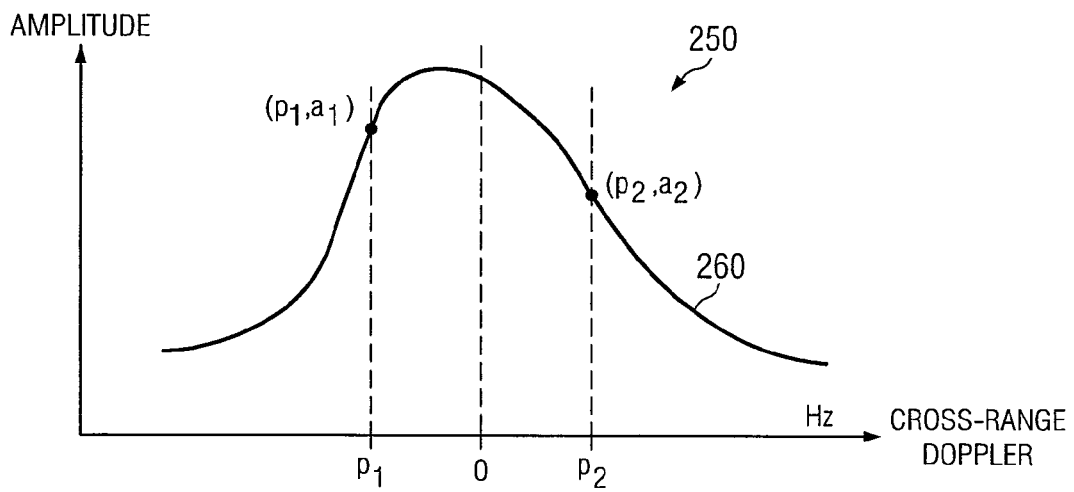
FIG. 5 is a graph illustrating an average clutter spectrum.

FIG. 5 is a graph 250 illustrating an average clutter spectrum 260. Measurement indices $p_1$ and $p_2$ have amplitudes $a_1$ and $a_2$. If the antenna boresight is properly aligned, amplitudes $a_1$ and $a_2$ are substantially equal. Average clutter spectrum 260, measurement indices $p_1$ and $p_2$, and amplitudes $a_1$ and $a_2$ are shown as examples only, and are not intended to limit the disclosure.

Referring back to FIG. 3, an amplitude imbalance may be detected at step 136. An amplitude imbalance may refer to a difference between the amplitudes of the measurement indices. As an example, a difference of more than a predetermined threshold, such as zero, may be determined to be an amplitude imbalance. If an amplitude imbalance is not detected, the method proceeds to step 129. If there is a next iteration at step 129, the method returns to step 116 to gather additional pulses. If there is no next iteration at step 129, the method terminates. If the amplitude imbalance is detected, the method proceeds to step 140.

An error estimate is determined at step 140. According to one embodiment, amplitude $a_1$ greater than $a_2$ may indicate an error in one direction, while amplitude $a_1$ less than amplitude $a_2$ may indicate an error in another direction. The error estimate may be expressed as positive or a negative error. According to another embodiment, the magnitude of the difference between amplitudes $a_1$ and $a_2$ may be reflected in the error estimate. For example, a greater difference may be reflected in a larger error estimate.

A correction estimate is determined at step 144. According to one embodiment, a positive correction in one direction may be determined for a positive error, and a negative correction in another direction may be determined for a negative error. According to another embodiment, a greater correction may be determined for a greater error estimate. The correction estimate is applied at step 148. The error correction may be applied by error corrector 42 of FIG. 2. If there is a next iteration at step 129, the method returns to step 116 to gather additional pulses. If there is no next iteration at step 129, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that data generated during normal operation of a radar system may be used to reduce antenna boresight error. The use of this data may allow for error reduction during normal operation of the radar system, which may provide for more efficient error reduction.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for determining an error estimate describing an antenna boresight error, comprising:
   receiving a plurality of radar pulses reflected from an object, the plurality of pulses carrying information about the object;
   generating a clutter spectrum from the information;
   measuring a plurality of amplitudes of the clutter spectrum;
   establishing if there is an amplitude imbalance in accordance with the measured amplitudes; and
   determining an error estimate if there is an amplitude imbalance, the error estimate describing an antenna boresight error of the antenna.

2. The method of claim 1, wherein measuring a plurality of amplitudes of the clutter spectrum further comprises:
   establishing a plurality of measurement indices from the information carried by the plurality of pulses; and
   measuring an amplitude of the clutter spectrum at each of the measurement indices.

3. The method of claim 1, wherein a pulse of the plurality of pulses is emitted from an antenna of a radar system, reflected by the object, and received by the antenna.

4. The method of claim 1, further comprising:
   generating at least a portion of an image of the object from the clutter spectrum.

5. The method of claim 1, further comprising:
   establishing a correction estimate in accordance with the error estimate; and
   adjusting the antenna in accordance with the correction estimate.

6. The method of claim 1, further comprising:
calculating a pulse repetition frequency from the information; and
determining whether the pulse repetition frequency is satisfactory.

7. The method of claim 1, further comprising:
calculating a clutter-to-noise ratio; and
determining whether the clutter-to-noise ratio is satisfactory.

8. The method of claim 1, wherein establishing if there is an amplitude imbalance further comprises:
calculating a difference between a first amplitude and a second amplitude; and
establishing that there is an amplitude imbalance if the difference is greater than a threshold value.

9. A system for determining an error estimate describing an antenna boresight error, comprising:
an interface operable to receive a plurality of radar pulses reflected from an object, the plurality of pulses carrying information about the object; and
an error estimator coupled to the interface and operable to:
generate a clutter spectrum from the information;
measure a plurality of amplitudes of the clutter spectrum;
establish if there is an amplitude imbalance in accordance with the measured amplitudes; and
determine an error estimate if there is an amplitude imbalance, the error estimate describing an antenna boresight error of the antenna.

10. The system of claim 9, the error estimator further operable to measure a plurality of amplitudes of the clutter spectrum by:
establishing a plurality of measurement indices from the information carried by the plurality of pulses; and
measuring an amplitude of the clutter spectrum at each of the measurement indices.

11. The system of claim 9, wherein a pulse of the plurality of pulses is emitted from an antenna of a radar system, reflected by the object, and received by the antenna.

12. The system of claim 9, further comprising:
an image processor operable to generate at least a portion of an image of the object from the clutter spectrum.

13. The system of claim 9, further comprising an error corrector coupled to the error estimator and operable to:
establish a correction estimate in accordance with the error estimate; and
adjust the antenna in accordance with the correction estimate.

14. The system of claim 9, the error estimator further operable to:
calculate a pulse repetition frequency from the information; and
determine whether the pulse repetition frequency is satisfactory.

15. The system of claim 9, the error estimator further operable to:
calculate a clutter-to-noise ratio; and
determine whether the clutter-to-noise ratio is satisfactory.

16. The system of claim 9, the error estimator further operable to establish if there is an amplitude imbalance by:
calculating a difference between a first amplitude and a second amplitude; and
establishing that there is an amplitude imbalance if the difference is greater than a threshold value.

17. Logic for determining an error estimator describing an antenna boresight error, the logic embodied in computer-readable storage media and operable to:
receive a plurality of radar pulses reflected from an object, the plurality of pulses carrying information about the object;
generate a clutter spectrum from the information;
measure a plurality of amplitudes of the clutter spectrum;
establish if there is an amplitude imbalance in accordance with the measured amplitudes; and
determine an error estimate if there is an amplitude imbalance, the error estimate describing an antenna boresight error of the antenna.

18. The logic of claim 17, further operable to measure a plurality of amplitudes of the clutter spectrum by:
establishing a plurality of measurement indices from the information carried by the plurality of pulses; and
measuring an amplitude of the clutter spectrum at each of the measurement indices.

19. The logic of claim 17, wherein a pulse of the plurality of pulses is emitted from an antenna of a radar system, reflected by the object, and received by the antenna.

20. The logic of claim 17, further operable to generate at least a portion of an image of the object from the clutter spectrum.

21. The logic of claim 17, further operable to:
establish a correction estimate in accordance with the error estimate; and
adjust the antenna in accordance with the correction estimate.

22. The logic of claim 17, further operable to:
calculate a pulse repetition frequency from the information; and
determine whether the pulse repetition frequency is satisfactory.

23. The logic of claim 17, further operable to:
calculate a clutter-to-noise ratio; and
determine whether the clutter-to-noise ratio is satisfactory.

24. The logic of claim 17, further operable to establish if there is an amplitude imbalance by:
calculating a difference between a first amplitude and a second amplitude; and
establishing that there is an amplitude imbalance if the difference is greater than a threshold value.

25. A system for determining an error estimate describing an antenna boresight error, comprising:
means for receiving a plurality of radar pulses reflected from an object, the plurality of pulses carrying information about the object;
means for generating a clutter spectrum from the information;
means for measuring a plurality of amplitudes of the clutter spectrum;
means for establishing if there is an amplitude imbalance in accordance with the measured amplitudes; and
means for determining an error estimate if there is an amplitude imbalance, the error estimate describing an antenna boresight error of the antenna.

* * * * *